United States Patent
Whittle et al.

(10) Patent No.: US 11,047,258 B2
(45) Date of Patent: Jun. 29, 2021

(54) TURBINE ASSEMBLY WITH CERAMIC MATRIX COMPOSITE VANE COMPONENTS AND COOLING FEATURES

(71) Applicant: Rolls-Royce plc, London (GB)

(72) Inventors: Jade L. Whittle, Derby (GB); Michael J. Whittle, Derby (GB)

(73) Assignee: Rolls-Royce plc

( * ) Notice: Subject to any disclaimer, the term of this patent is extended or adjusted under 35 U.S.C. 154(b) by 196 days.

(21) Appl. No.: 16/164,312

(22) Filed: Oct. 18, 2018

(65) Prior Publication Data

US 2020/0123928 A1 Apr. 23, 2020

(51) Int. Cl.
| F01D 9/04 | (2006.01) |
| F01D 25/12 | (2006.01) |
| F01D 11/16 | (2006.01) |
| F01D 17/08 | (2006.01) |

(52) U.S. Cl.
CPC ............. *F01D 25/12* (2013.01); *F01D 9/042* (2013.01); *F01D 11/16* (2013.01); *F01D 17/085* (2013.01); *F05D 2220/32* (2013.01); *F05D 2240/12* (2013.01); *F05D 2240/55* (2013.01); *F05D 2260/221* (2013.01); *F05D 2270/01* (2013.01); *F05D 2300/21* (2013.01)

(58) Field of Classification Search
CPC .......... F01D 25/12; F01D 9/042; F01D 11/16; F01D 17/085; F05D 2220/32; F05D 2240/12; F05D 2240/55; F05D 2260/221; F05D 2270/01; F05D 2300/21
See application file for complete search history.

(56) References Cited

U.S. PATENT DOCUMENTS

| 4,668,162 A | 5/1987 | Cederwall et al. |
| 4,683,716 A | 8/1987 | Wright et al. |
| 5,772,400 A | 6/1998 | Pellow |
| 5,993,150 A | 11/1999 | Liotta et al. |
| 9,458,855 B2 | 10/2016 | Dierksmeier et al. |
| 9,670,785 B2 | 6/2017 | Johns et al. |
| 10,738,791 B2 * | 8/2020 | Moniz ................... F04D 29/321 |
| 2005/0109016 A1 | 5/2005 | Ullyott |
| 2006/0259156 A1 * | 11/2006 | Jones ........................ F02C 7/18 700/11 |
| 2008/0131270 A1 | 6/2008 | Paprotna et al. |
| 2009/0104020 A1 * | 4/2009 | Roush ..................... F01D 25/12 415/145 |
| 2016/0305281 A1 * | 10/2016 | Ballard, Jr. ............. F02C 3/067 |
| 2017/0022900 A1 * | 1/2017 | Miller ..................... F01D 9/065 |
| 2017/0044922 A1 * | 2/2017 | Shapiro ..................... F01D 5/12 |
| 2017/0081966 A1 * | 3/2017 | Huizenga ................ F01D 25/12 |
| 2017/0167273 A1 | 6/2017 | Maguire et al. |
| 2017/0298753 A1 * | 10/2017 | O'Leary ................... F01D 9/02 |

* cited by examiner

*Primary Examiner* — Justin D Seabe
*Assistant Examiner* — Theodore C Ribadeneyra
(74) *Attorney, Agent, or Firm* — Barnes & Thornburg LLP

(57) ABSTRACT

A turbine assembly according to the present disclosure includes ceramic matrix composite vanes mounted to a metallic case. The turbine assembly includes a turbine case cooling system with a vane case cooling unit configured to manage the temperature and diameter of the metallic case at the location where the ceramic matrix composite vanes are mounted so as to control circumferential movement of the vanes relative to one another during heating and cooling of the turbine assembly when used in a gas turbine engine.

13 Claims, 5 Drawing Sheets

TURBINE ASSEMBLY WITH CERAMIC MATRIX COMPOSITE VANE COMPONENTS AND COOLING FEATURES

FIELD OF THE DISCLOSURE

The present disclosure relates generally to gas turbine engines, and more specifically to cooling systems that may be integrated into turbine assemblies used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The static vane assemblies each include a number of vane airfoils arranged to form a ring. The rotating wheel assemblies include disks carrying blades around their outer edges. The vane airfoils are mounted to an overall case along with blade tracks included in static seal rings that are arranged around the rotating wheel assemblies.

Some turbines include cooling systems for managing the temperatures of components when used in the overall engine. In particular, cooling systems for actively cooling vane airfoils, turbine blades, and seal rings can be included in turbines. Current design trends incorporate ceramic matrix composite materials with relatively high allowable temperature challenges that often do not require active cooling. However, incorporation of components made of these materials present new design challenged—especially when considering the differences in thermal expansion between ceramic matrix composite materials and more traditional metallic materials.

SUMMARY

The present disclosure may comprise one or more of the following features and combinations thereof.

A turbine assembly according to the present disclosure is adapted for use in a gas turbine engine configured for aerospace applications. The turbine assembly may include a vane ring with a plurality of static vanes comprising ceramic matrix composite materials and a turbine case arranged with a vane support to which at least some of the vanes included in the vane ring are coupled. The static vanes may be mounted for movement circumferentially toward and away from one another upon contraction and expansion in diameter of the vane support caused by temperatures experienced during use of the turbine assembly. The movement of the vanes away from one another increases leakage and reduces the efficiency of the engine.

In illustrative embodiments, a turbine case cooling system including a vane case cooling unit may be provided. The vane case cooling unit can be configured to cool the vane support of the turbine case to which the vanes of the vane ring are mounted so as to manage the temperature and diameter of the vane support. Accordingly, circumferential movement of at least some of vanes caused by expansion and contraction of the vane support can be controlled.

In some embodiments, the vane case cooling unit may include a vane case cooling air distributor configured to discharge cooling air onto the vane support of the turbine case. In one example, the vane case cooling air distributor may be fluidly coupled directly to a low pressure cooling air source (such as a turbofan or early compressor stage of the engine). In another example, the vane case cooling air distributor may also be fluidly coupled indirectly to a low pressure cooling air source in series with another component. Specifically, the vane case cooling air distributor may be fluidly coupled in series with a tip clearance cooling air distributor used to manage a gap around an associated rotating turbine wheel.

In other embodiments, the vane case cooling unit may include conductive strip of metallic material. The strip of metallic material may be actively cooled at a location spaced apart from the vane support of the turbine case. In one example, the strip of metallic material may be actively cooled by, and extend from, from a tip clearance cooling air distributor used to manage a gap around an associated rotating turbine wheel.

These and other features of the present disclosure will become more apparent from the following description of the illustrative embodiments.

DETAILED DESCRIPTION OF THE DRAWINGS

Figure 1:
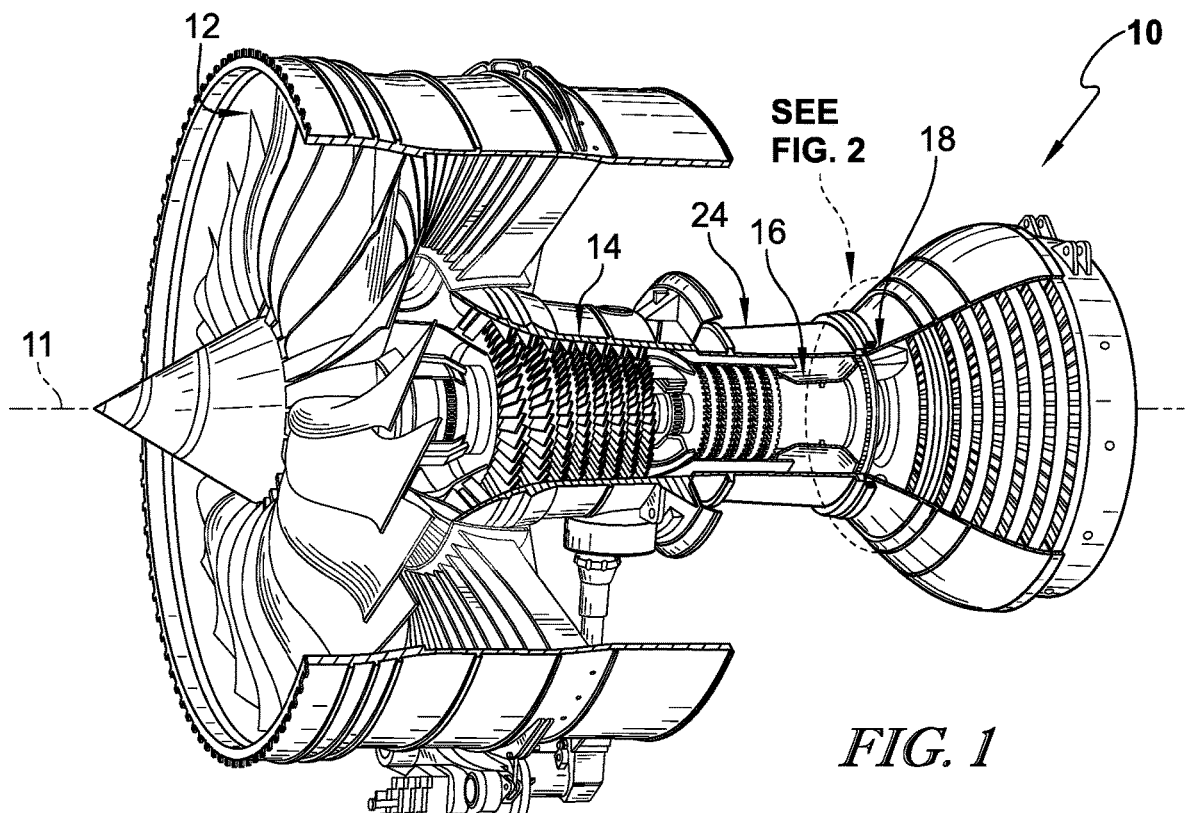
FIG. 1 is a perspective view of a gas turbine engine with a portion of the engine cut away to show, from left to right, a turbofan, a compressor section, a combustor, and a turbine assembly section included in the engine.

For the purposes of promoting an understanding of the principles of the disclosure, reference will now be made to a number of illustrative embodiments illustrated in the drawings and specific language will be used to describe the same.

An exemplary gas turbine engine 10 according to the present disclosure is shown in FIG. 1. The engine 10 includes a turbofan 12, a compressor section 14, a combustor 16, and a turbine section 18. The fan 12 rotates to provide thrust to an associated aircraft. The compressor section 14 draws in air and compresses it increasing pressure of the air before delivering it to the combustor 16. In the combustor 16, fuel is mixed with the pressurized air from the compressor section and is ignited to create hot high-pressure combustion products. The combustion products move out of the combustor and into the turbine section 18 where they interact with the turbine section creating rotation of some turbine assembly section 18 components that, in turn, drive rotation of the fan 12 as well as some components of the compressor section 14.

Figure 2:
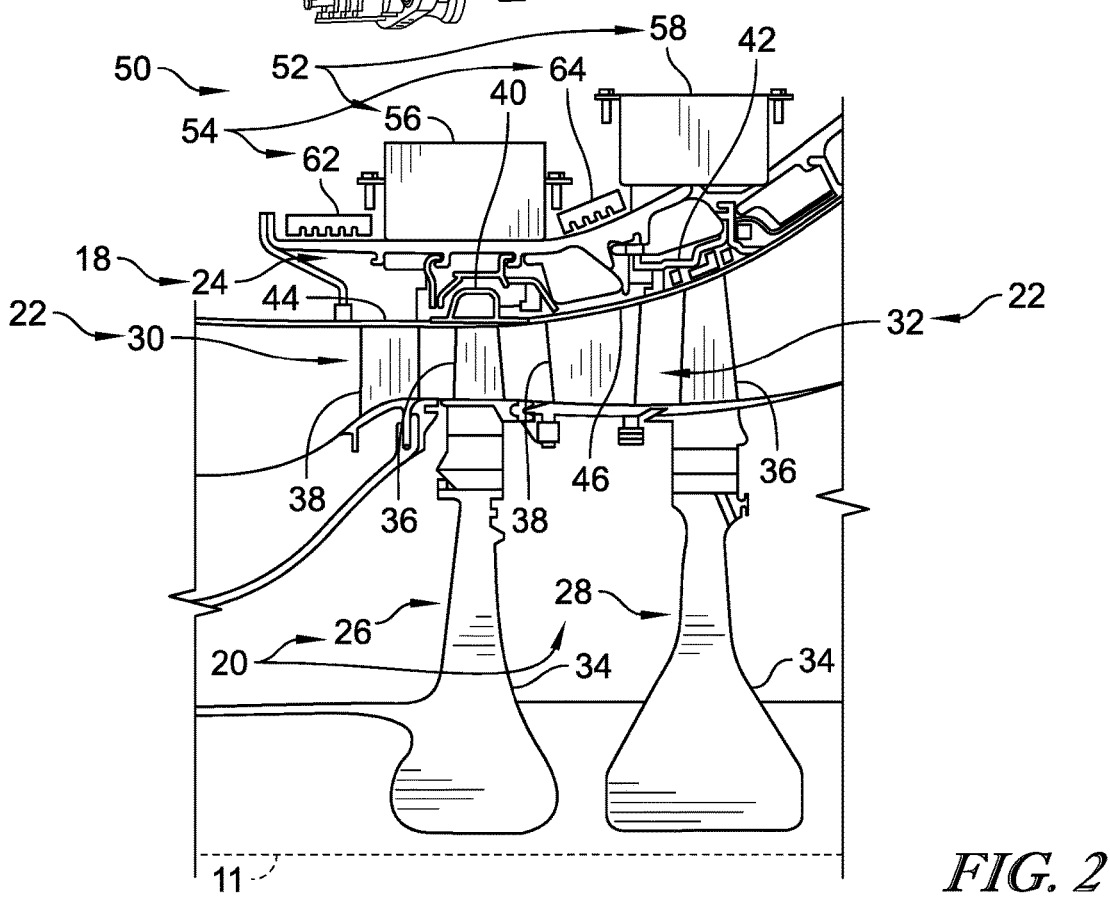
FIG. 2 is a cross-section view of a portion of the turbine assembly section of the gas turbine engine of FIG. 1 showing that the turbine assembly includes a turbine case surrounding rotatable turbine wheel assemblies and static turbine vane assemblies.
Figure 3:
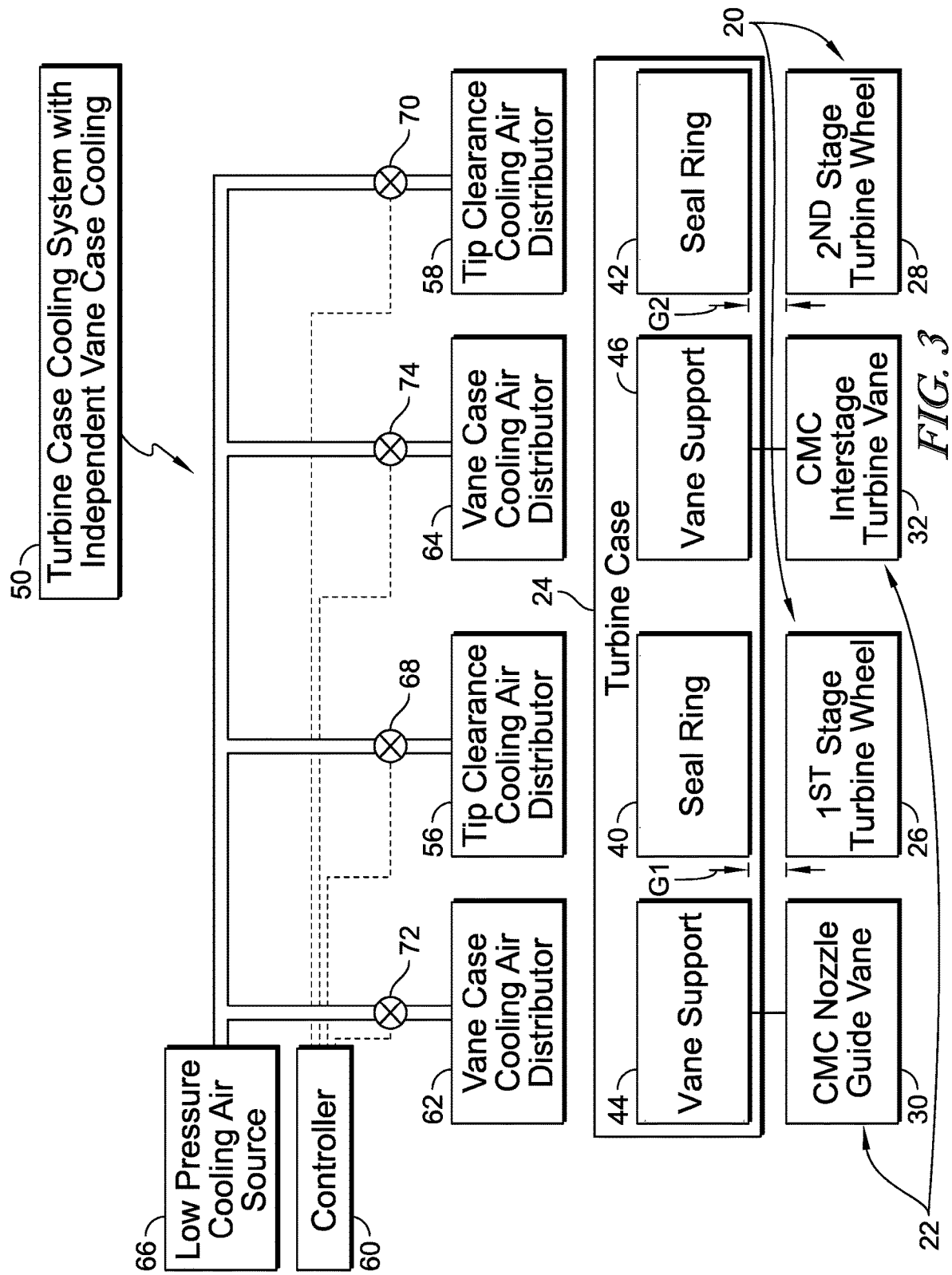
FIG. 3 is a diagrammatic view of the turbine assembly of FIG. 2 showing that the turbine case includes seal rings arranged around the turbine wheel assemblies and vane supports comprising metallic materials for mounting the static turbine vane assemblies, and further showing a turbine case cooling system including vane case cooling air distributors and tip clearance cooling air distributors both configured to control the distribution of cooling air to the components of the turbine case to manage the temperature of components in the turbine case.

The turbine assembly 18 includes a plurality of turbine wheel assemblies 20, a plurality of turbine vane ring assemblies 22, and a turbine case 24 as shown in FIGS. 1-3. Each turbine wheel assembly 20 is configured to interact with the hot combustion gases from the combustor 16 and rotate about a central axis 11 of the gas turbine engine 10 to generate power for driving the compressor 14 and/or the fan 12. The turbine vane ring assemblies 22 are configured to direct gases received from an upstream turbine wheel assembly 20 toward a downstream turbine wheel assembly 20. The turbine case 24 is arranged around the central axis 11 and encases the turbine wheel assemblies 20 and the turbine vane ring assemblies 22.

In the illustrative embodiments, the plurality of turbine wheel assemblies 20 includes at least a first stage turbine wheel 26 and a second stage turbine wheel 28 as shown in FIG. 2. Each of the plurality of turbine wheels 20 includes a disk 34 and a plurality of blades 36 as shown in FIG. 2. The blades 36 extend radially outwardly form the disk 34 away from the central axis 11. In other embodiments a single turbine wheel assembly or more than two turbine wheel assemblies may be used.

In the illustrative embodiments, the plurality of turbine vane ring assemblies 22 includes at least a first nozzle guide vane 30 and an interstage turbine vane 32 as shown in FIG. 2. Each of the plurality of turbine vane rings 22 includes a plurality of static vanes 38 as shown in FIG. 2. The static vanes 38 comprise ceramic matrix composite materials that can withstand temperatures generally much greater than metallic materials.

The turbine case 24 includes a seal ring 40, 42 and a vane support 44, 46 as shown in FIGS. 2 and 3. The seal ring 40, 42 has a variable diameter that is passively controlled by controlling the temperature of the seal ring 40, 42 with cooling air. The seal ring 40, 42 is arranged around tips of the blades 36 included the turbine wheels 20 to establish a blade tip clearance gap G1, G2 therebetween. The vane support 44, 46 to which at least some of the vanes 38 included in the turbine vane rings 22 are mounted comprises metallic materials and is configured to support the vanes 38. The vanes 38 are mounted on the vane support 44, 46 for movement circumferentially toward and away from one another upon contraction and expansion in diameter of the vane support 44, 46 caused by temperatures experienced during use of the turbine assembly 18.

The turbine assembly 18 further includes a turbine case cooling system 50 as shown in FIGS. 2 and 3. The turbine case cooling system 50 is arranged to control the distribution and flow of cooling air to the components of the turbine case 24.

The turbine case cooling system 50 includes a tip clearance cooling unit 52 provided by air distributors 56, 58, a vane case cooling unit 54 provided by air distributors 62, 64, and a controller 60 as shown in FIGS. 2 and 3. The tip clearance cooling air distributor 56, 58 is configured to discharge cooling air to the seal ring 40, 42 arranged around the tips of the blades 36 to manage the temperature and diameter of the seal ring 40, 42 such that the blade tip clearance gap G1, G2 is controlled. The vane case cooling air distributor 62, 64 is configured to discharge cooling air onto the vane support 44, 46 of the turbine case 24 to which the vanes 38 of the turbine vane rings 22 are mounted so as to manage the temperature and diameter of the vane support 44, 46 such that circumferential movement of at least some of the vanes 38 caused by the vane support is controlled. The controller 60 is configured to selectively supply cooling air to the tip clearance cooling air distributor 56, 58 and/or the vane case cooling air distributor 62, 64 from a low pressure cooling air source 66.

The low pressure cooling air source 66 may supply air from the turbofan 12. In other embodiments, the low pressure cooling air source 66 may come in whole or in part from early stages of the compressor 14.

The controller 60 is configured to selectively supply cooling air to the tip clearance cooling air distributor 56, 58 and/or the vane case cooling air distributor 62, 64 from the low pressure cooling air source 66 based on different factors. For instance, the controller 60 is configured to supply cooling air to the tip clearance cooling air distributor 56, 58 and/or the vane case cooling air distributor 62, 64 based on temperature inputs from temperature sensors associated with the turbine assembly 18.

In other embodiments, the controller 60 is configured to supply the tip clearance cooling air distributor 56, 58 and/or the vane case cooling air distributor 62, 64 based on engine mode inputs associated with the engine 10 in which the turbine assembly 18 is included. For instance, the controller 60 is configured to supply different amounts of cooling air to the tip clearance cooling air distributor 56, 58 and/or the vane case cooling air distributor 62, 64 at different engine modes phases such as, cruise, take-off, etc. For example, the controller 60 is configured to supply an amount of cooling air to the tip clearance cooling air distributor 56, 58 and/or the vane case cooling air distributor 62, 64 when the engine mode input indicates cruise and a different amount of cooling air when the engine mode input indicates take-off power.

In the illustrative embodiment, the turbine case cooling system 50 further includes tip clearance cooling control valves 68, 70, and vane case cooling control valves 72, 74 as shown in FIG. 3. One of the tip clearance cooling control valves 68, 70 is fluidly coupled to the tip clearance cooling air distributor 56, 58 and in communication with the controller 60. One of the vane case cooling control valves 72, 74 is fluidly coupled to the vane case cooling air distributor 62, 64 and in communication with the controller 60. Each of the valves 68, 70, 72, 74 are configured to move between an open position in which cooling air is allowed flow through the valve 68, 70, 72, 74 from the cooling air source 66 to the distributor 56, 58, 62, 64 and a closed position in which cooling air is blocked from flowing through the valve 68, 70, 72, 74 from the cooling air source 66 to the distributor 56, 58, 62, 64.

In the illustrative embodiment, the vane case cooling air distributor 62, 64 is configured to receive cooling air independently of the tip clearance cooling air distributor 56, 58. Each of the valves 68, 70, 72, 74 are individually supplied air from the low pressure cooling air source 66 and are individually controlled by the controller 60 to change between the open and closed positions.

In the illustrative embodiments, the turbine case includes a first seal ring 40, a second seal ring 42, a first vane support 44, and a second vane support 46 as shown in FIG. 3. The first seal ring 40 is arranged around tips of the blades 36 included in the first stage turbine wheel 26 to establish the blade tip clearance gap G1 therebetween. The second seal ring 42 is arranged around the tips of the blades 36 included in the second stage turbine wheel 28 to establish the blade tip clearance G2 therebetween. Additionally, the first vane support 44 to which at least some of the vanes 38 included in the first nozzle guide vane ring 30 are mounted is configured to support the vanes 38. The vanes 38 are mounted on the vane support 44 for movement circumferentially toward and away from one another upon contraction and expansion in diameter of the vane support 44 caused by temperatures experienced during use of the turbine assembly 18. The second vane support 46 to which at least some of the vanes 38 included in the interstage turbine vane ring 32 are mounted is configured to support the vanes 38. The vanes 38 are mounted on the vane support 46 for movement circumferentially toward and away from one another upon contraction and expansion in diameter of the vane support 46 caused by temperatures experienced during use of the turbine assembly 18.

In the illustrative embodiment, the first tip clearance cooling air distributor 56 is configured to discharge cooling air to the seal ring 40 arranged around the tips of the blades 36 to manage the temperature and diameter of the seal ring 40 such that the blade tip clearance gap G1 is controlled. Additionally, the second tip clearance cooling air distributor 58 is configured to discharge cooling air to the seal ring 42 arranged around the tips of the blades 36 to manage the temperature and diameter of the seal ring 42 such that the blade tip clearance gap G2 is controlled.

The vane case cooling air distributor 62 is configured to discharge cooling air onto the vane support 44 of the turbine case 24 to which the vanes 38 of the first nozzle guide vane 30 are mounted so as to manage the temperature and diameter of the vane support 44. Additionally, the vane case cooling air distributor 64 is configured to discharge cooling air onto the vane support 46 of the turbine case 24 to which the vanes 38 of the first nozzle guide vane 30 are mounted so as to manage the temperature and diameter of the vane support 46.

In some embodiments, the first and second tip clearance cooling air distributors 56, 58 are a single cooling air distributor. Additionally, the first and second vane case cooling air distributors 62, 64 are a single cooling air distributor.

In the illustrative embodiment, the tip clearance control valve 68 is fluidly coupled to the first tip clearance cooling air distributor 56 and the tip clearance control valve 70 is fluidly coupled to the second tip clearance cooling air distributor 58. The controller 60 is configured to supply cooling air to the tip clearance cooling air distributors 56, 58 by changing the valves 68, 70 between the closed position and the open positions. The controller 60 changes the position of the valves 68, 70 based on temperature inputs from temperature sensors associated with the turbine assembly 18 and/or engine mode inputs associated with the engine 10 in which the turbine assembly 18 is included.

In the illustrative embodiment, the vane case cooling control valve 72 is fluidly coupled to the first vane case cooling air distributor 62 and the vane case cooling air valve 74 is fluidly coupled to the second vane case cooling air distributor 64. The controller 60 is configured to supply cooling air to the vane case cooling air distributors 62, 64 by changing the valves 72, 74 between the closed position and the open positions. The controller 60 changes the position of the valves 72, 74 based on temperature inputs from temperature sensors associated with the turbine assembly 18 and/or engine mode inputs associated with the engine 10 in which the turbine assembly 18 is included.

Figure 4:
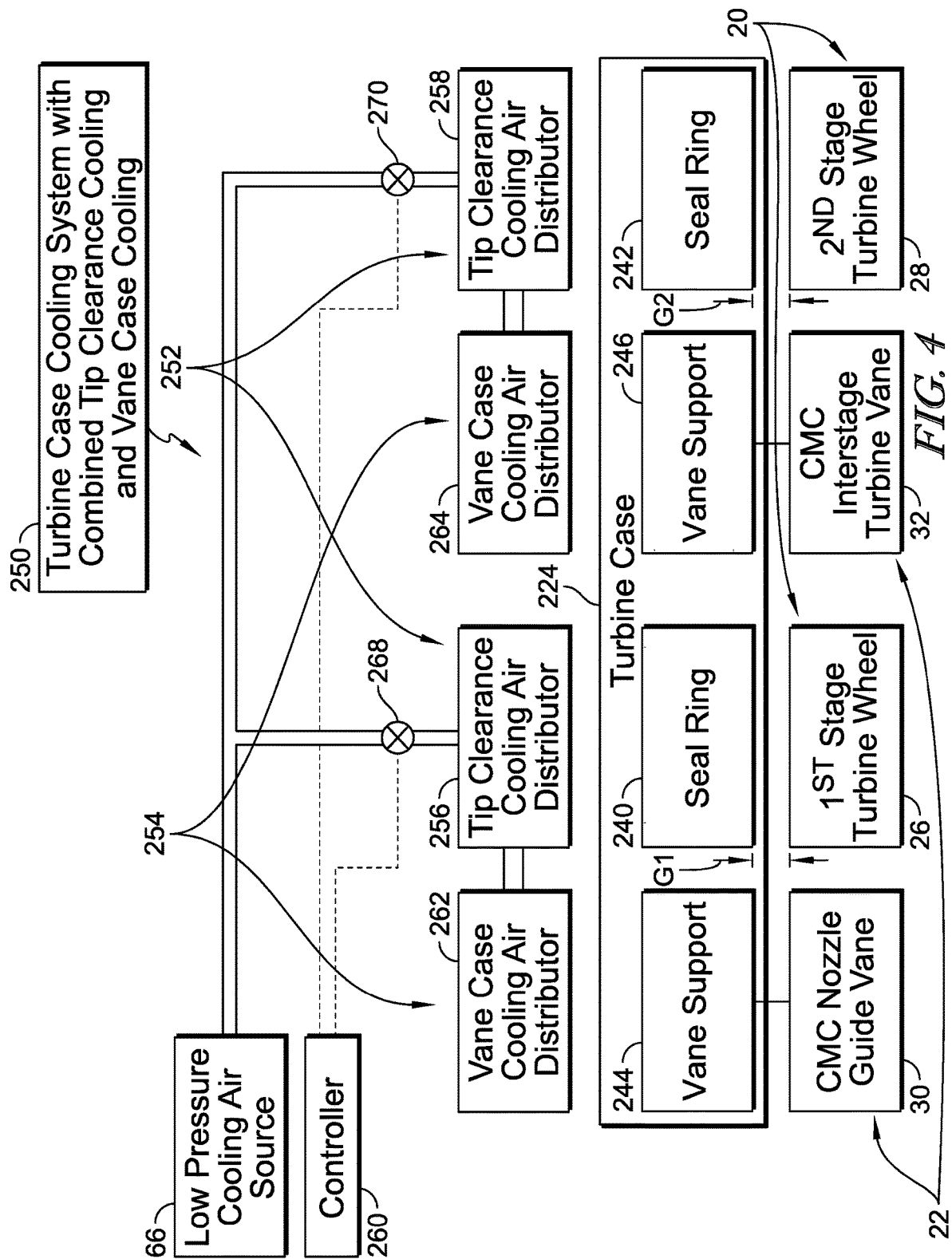
FIG. 4 is a diagrammatic view of a second turbine case cooling system adapted for use in a turbine assembly showing that the second turbine case cooling system includes tip clearance cooling air distributors and vane case cooling air distributors configured to receive cooling air from the tip clearance cooling air distributor such that the vane case cooling air distributor is in series.

A second illustrative turbine case cooling system 250 is shown in FIG. 4. The turbine case cooling system 250 is configured for use in a turbine assembly 218 as part of engine 10. The turbine case cooling system 250 is substantially similar to the turbine case cooling system 50 shown in FIGS. 1-3 and described herein. Accordingly, similar reference numbers in the 200 series indicate features that are common between the turbine case cooling system 50 and the turbine case cooling system 250. The description of the turbine case cooling system 50 is hereby incorporated by reference to apply to the turbine case cooling system 250, except in instances when it conflicts with the specific description and drawings of the turbine case cooling system 250.

The turbine case cooling system 250 includes a tip clearance cooling unit 252 provided by air distributors 256, 258, a vane case cooling unit 254 provided by air distributors 262, 264, and a controller 260 as shown in FIG. 4. The tip clearance cooling air distributor 256, 258 is configured to discharge cooling air to the seal ring 240, 242 arranged around the tips of the blades 36 to manage the temperature and diameter of the seal ring 240, 242 such that the blade tip clearance gap G1, G2 is controlled. The vane case cooling air distributor 262, 264 is configured to discharge cooling air onto the vane support 244, 246 of the turbine case 224 to which the vanes 38 of the turbine vane rings 222 are mounted so as to manage the temperature and diameter of the vane support 244, 246 such that circumferential movement of at least some of the vanes 38 caused by the vane support 244, 246 is controlled. The controller 260 is configured to selectively supply cooling air to the tip clearance cooling air distributor 256, 258 from the low pressure cooling air source 266.

In the illustrative embodiment, the vane case cooling air distributors 262, 264 are configured to receive cooling air in series from the tip clearance cooling air distributors 256, 258. Accordingly, the vane case cooling air distributors 262, 264 are active when the tip clearance cooling air distributors 256, 258 are active. An orifice may be arranged between the vane case cooling air distributors 262, 264 and the associated tip clearance cooling air distributors 256, 258 to control flow therebetween.

In the illustrative embodiment, the turbine case cooling system 250 further includes tip clearance cooling control valves 268, 270 as shown in FIG. 4. Each of the tip clearance cooling control valves 268, 270 are fluidly coupled to the tip clearance cooling air distributor 256, 258 and are in communication with the controller 60. Each of the valves 268, 270 are configured to move between an open position in which cooling air is allowed flow through the valve from the cooling air source 266 to the distributor 256, 258 and a closed position in which cooling air is blocked from flowing through the valve from the cooling air source 66 to the distributor 256, 258.

In the illustrative embodiment, the tip clearance control valve 268 is fluidly coupled to the first tip clearance cooling air distributor 256 and the tip clearance control valve 270 is fluidly coupled to the second tip clearance cooling air distributor 258. The controller 260 is configured to supply cooling air to the tip clearance cooling air distributors 256, 258 by moving the valves 268, 270 between the closed position and the open position. The controller 260 changes the position of the valve 268, 270 based on temperature inputs from temperature sensors associated with the turbine assembly 218 and/or engine mode inputs associated with the engine 10 in which the turbine assembly 218 is included.

Figure 5:
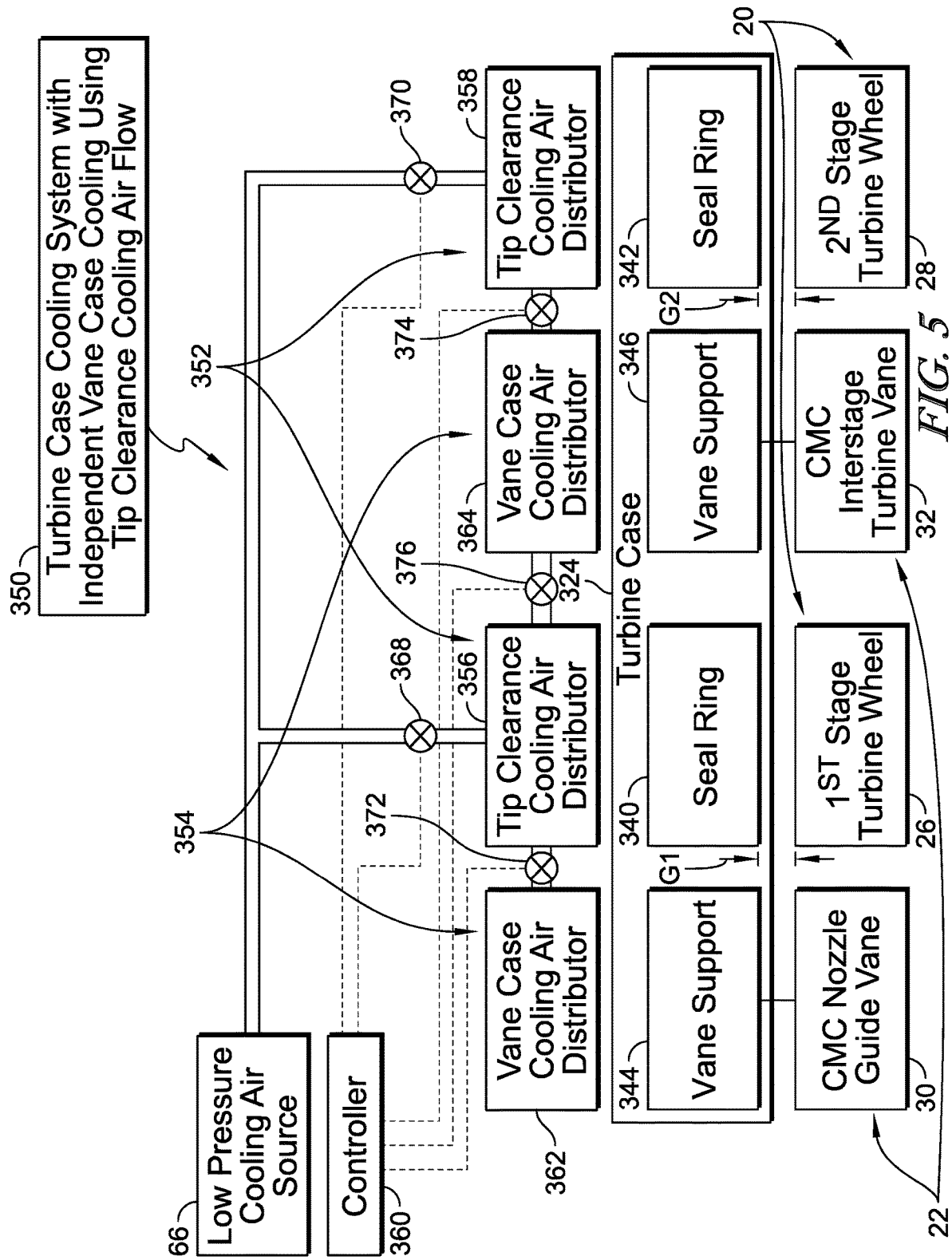
FIG. 5 is a diagrammatic view of a third turbine case cooling system adapted for use in a turbine assembly showing that the third turbine case cooling system includes tip clearance cooling air distributors, vane case cooling air distributors, and interstage control valves that are fluidly coupled between the vane case cooling air distributors and the tip clearance cooling air distributors to control the movement of cooling air therebetween.

A third illustrative turbine case cooling system 350 is shown in FIG. 5. The turbine case cooling system 350 is configured for use in a turbine assembly 318 as part of engine 10. The turbine case cooling system 350 is substantially similar to the turbine case cooling system 50 shown in FIGS. 1-3 and described herein. Accordingly, similar reference numbers in the 300 series indicate features that are common between the turbine case cooling system 50 and the turbine case cooling system 350. The description of the turbine case cooling system 50 is hereby incorporated by reference to apply to the turbine case cooling system 350, except in instances when it conflicts with the specific description and drawings of the turbine case cooling system 350.

The turbine case cooling system 350 includes a tip clearance cooling unit 352 provided by air distributors 356, 358, a vane case cooling unit 354 provided by air distributors 362, 364, and a controller 360 as shown in FIG. 5.

The tip clearance cooling air distributor 356, 358 is configured to discharge cooling air to the seal ring 340, 342 arranged around the tips of the blades 36 to manage the temperature and diameter of the seal ring 340, 342 such that the blade tip clearance gap G1, G2 is controlled. The vane case cooling air distributor 362, 364 is configured to discharge cooling air onto the vane support 344, 346 of the turbine case 324 to which the vanes 38 of the turbine vane rings 322 are mounted so as to manage the temperature and diameter of the vane support 344, 346 such that circumferential movement of at least some of the vanes 38 caused by the vane support 344, 346 is controlled. The controller 360 is configured to selectively supply cooling air to the tip clearance cooling air distributor 356, 358 and the vane case cooling air distributor 362, 364 from a low pressure cooling air source 66.

In the illustrative embodiment, the turbine case cooling system 350 further includes tip clearance cooling control valves 368, 370, vane case cooling control valves 372, 374, and an interstage cooling control valve 376 as shown in FIG. 5. One of the tip clearance cooling control valves 368, 370 is fluidly coupled to the tip clearance cooling air distributor 356, 358 and in communication with the controller 360. One of the vane case cooling control valves 372, 374 is fluidly coupled between the vane case cooling air distributor 362, 364 and the tip clearance cooling air distributor 356, 358 and in communication with the controller 360. The interstage cooling control valve 376 is fluidly coupled between the first tip clearance cooling air distributor 356 and the second vane case cooling air distributor 366 and in communication with the controller 360.

In the illustrative embodiment, the tip clearance control valve 368 is fluidly coupled to the first tip clearance cooling air distributor 356 and the tip clearance control valve 370 is fluidly coupled to the second tip clearance cooling air distributor 358. Additionally, the vane case cooling control valve 372 is fluidly coupled between the first tip clear cooling air distributor 356 and the first vane case cooling air distributor 366 to selectively control flow of cooling air therebetween. The vane case cooling control valve 374 is fluidly coupled between the second tip clear cooling air distributor 358 and the second vane case cooling air distributor 368 to selectively control flow of cooling air therebetween.

In the illustrative embodiment, the vane case cooling air distributors 362, 364 are configured to selectively receive cooling air in series from the tip clearance cooling air distributors 356, 358 when the vane case cooling control valves 372, 374 are moved between the open and closed positions. Accordingly, the vane case cooling air distributors 362, 364 are active only when the tip clearance cooling air distributors 356, 358 are active and the vane case cooling control valves 372, 374 are in the open position.

In the illustrative embodiment, the second vane case cooling air distributor 364 is also configured to selectively receive cooling air in series from the first tip clearance cooling air distributor 356 when the interstage control valve 376 is moved between the open and closed positions. Accordingly, the second vane case cooling air distributor 364 is also active when the first tip clearance cooling air distributor 356 is active and the interstage control valve 376 is in the open position.

Figures 6, 7:
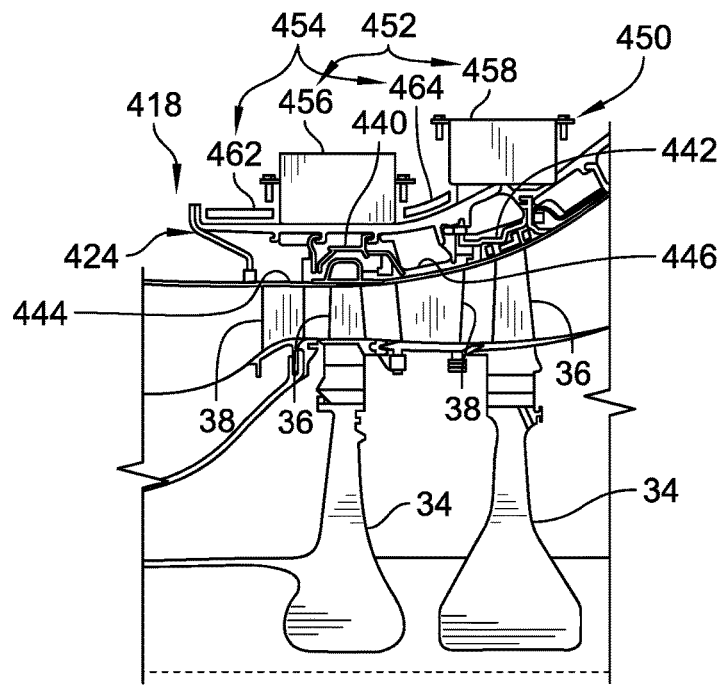
FIG. 6 is a cross-section view of a portion of a turbine assembly for use in the gas turbine engine of FIG. 1 showing that the turbine assembly includes a fourth turbine case cooling system including a tip clearance cooling unit that provides cooling air and a vane case cooling unit that relies on conductive materials to cool selected parts of a turbine case.
FIG. 7 is a diagrammatic view of the turbine assembly of FIG. 6 showing that the vane case cooling unit includes a conductive strip of metallic material that extends from the tip clearance cooling unit such that cooling air from the tip clearance cooling unit indirectly cools static vane supports included in the turbine case.

A fourth illustrative turbine case cooling system 450 is shown in FIGS. 6 and 7. The turbine case cooling system 450 is configured for use in a turbine assembly 418 as part of engine 10. The turbine case cooling system 450 is substantially similar to the turbine case cooling system 50 shown in FIGS. 1-3 and described herein. Accordingly, similar reference numbers in the 400 series indicate features that are common between the turbine case cooling system 50 and the turbine case cooling system 450. The description of the turbine case cooling system 50 is hereby incorporated by reference to apply to the turbine case cooling system 450, except in instances when it conflicts with the specific description and drawings of the turbine case cooling system 450.

The turbine case cooling system 450 includes a tip clearance cooling unit 452 provided by air distributors 456, 458, a vane case cooling unit 454 provided by conductive strips of metallic material 462, 464, and a controller 460 as shown in FIGS. 6 and 7. The tip clearance cooling unit 452 is configured to actively cool the seal ring 440, 442 arranged around the tips of the blades 36 to manage the temperature and diameter of the seal ring 440, 442 such that the blade tip clearance gap G1, G2 is controlled.

The vane case cooling unit 454 is configured to passively cool the vane support 444, 446 of the turbine case 424 to which the vanes 38 of the vane rings 22 are mounted so as to manage the temperature and diameter of the vane support 444, 446 such that circumferential movement of at least some of the vanes 38 caused by the vane support 444, 446 is controlled. The controller 460 is configured to selectively supply cooling air to the tip clearance cooling air distributor 456, 458 from a low pressure cooling air source 66.

The vane case cooling unit 454 includes a conductive strip of metallic material 462, 464 as shown in FIGS. 6 and 7. The conductive strip 446, 464 extends from the tip clearance cooling air distributors 456, 458 of the tip clearance cooling unit 452 into contact with the vane support 444, 446 of the turbine case 424. The high conductive strip of metallic material 462, 464 cools the vane support 444, 446 of the turbine case 424 to manage the temperature and diameter of the vane support 444, 446 such that circumferential movement of the vanes 38 is controlled.

In the illustrative embodiment, the first conductive strip 462 extends from the first tip clearance cooling air distributor 456 and the second conductive strip 464 extends from the second tip clearance cooling air distributor 458. The conductive strips 462, 464 are configured to receive cooling air from the tip clearance cooling air distributors 456, 458 to cool the conductive strips 462, 464 and thus cool the vane supports 444, 446. As the conductive strips 462, 464 are in series with the tip clearance cooling air distributors 456, 458, the conductive strips 462, 464 are actively cooling the vane supports 444, 446 when the tip clearance cooling air distributors 456, 458 are active. In other embodiments, the conductive strips 462, 464 are selectively active when the tip clearance cooling air distributors 456, 458 are active.

The present disclosure relates to cooling turbine casings at a location where ceramic matrix composite nozzle guide vanes are attached in addition to the tip clearance cooling system. The cooling of the turbine casing at the attachment of the vanes reduces the magnitude of the thermal expansion of the turbine case, thus reducing the nozzle guide vanes inter-platform gaps. As such, reducing the inter-platform gaps reduces the leakage of coolant and directly improves the specific fuel consumption of the gas turbine engine.

For conventional metallic nozzle guide vanes, the circumferential gaps between the nozzle guide vane platforms that are present at cold-build are reduced during the running of the engine due to thermal expansion of the components. However, the thermal expansion of the ceramic matrix composite material is roughly one third of typical nickle based alloys. Therefore, circumferential growth of a ceramic matrix composite platform is significantly lower than that of the metallic turbine casing. As a result, the gaps grow larger during running of the engine, which increases the leakage and reduces the efficiency of the engine.

Such a cooling system for the turbine casing may be used for any ceramic matrix composite or other low coefficient of thermal expansion components of the engine. The cooling system manages the significant differences in the circumferential growth of the ceramic matrix composite components or nozzle guide vanes relative to the radial growth of the metallic turbine casing.

The cooling system cools the turbine casing of the static turbine components, such as the nozzle guide vanes, thus reducing the thermal expansion. The cooling system may be a separate system using dedicated cooling air to cool the nozzle guide vanes or an extension of the existing blade tip clearance control system. The casing may include features such as channels to direct air between the casings to maximize and tailor the heat transfer coefficients.

In other embodiments, the cooling system may use highly conductive metallic strips attached to the casing and stretching axially from the blade tip clearance control systems toward the nozzle guide vanes. As the gap increases with temperature, the conductive strip reduces the gap by cooling the casing. The system may be passive and would modulate on its own.

Inter-platform sealing between ceramic matrix composite HP2 nozzle guide vanes accounts for 0.1 percent of the specific fuel consumption. The cooling system reduces the magnitude of the casing thermal expansion, thus reducing the nozzle guide vane inter-platform gaps directly improving the specific fuel consumption of the engine. In the illustrative embodiments, the cooling system is used for HP2 nozzle guide vanes. In other embodiments, the cooling system may be used for high pressure/low pressure vanes.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine assembly, the assembly comprising
a turbine wheel mounted for rotation about a central axis, the turbine wheel including a disk and blades extending radially outwardly from the disk away from the central axis,
a vane ring including a plurality of static vanes comprising ceramic matrix composite materials,
a turbine case arranged around a central axis, the turbine case including (i) a seal ring arranged around tips of the blades included in the turbine wheel to establish a blade tip clearance gap therebetween and (ii) a vane support to which at least some of the vanes included in the vane ring are mounted for movement circumferentially toward and away from one another upon contraction and expansion in diameter of the vane support caused by temperatures experienced during use of the turbine assembly, and
a turbine case cooling system including (i) a tip clearance cooling air distributor configured to discharge cooling air to the seal ring arranged around the tips of the blades to manage the temperature and diameter of the seal ring such that the blade tip clearance gap is controlled and (ii) a vane case cooling air distributor configured to discharge cooling air toward the vane support of the turbine case to which the vanes of the vane ring are mounted so as to manage the temperature and diameter of the vane support such that circumferential movement of the at least some vanes caused by the vane support is controlled,
wherein the turbine case cooling system further includes a controller configured to selectively supply cooling air to the tip clearance cooling distributor and to selectively supply cooling air to the vane case cooling air distributor independent of the supply to the tip clearance cooling air distributor to control expansion and contraction of the diameter of the vane support.

2. The assembly of claim 1, wherein the controller is configured to supply cooling air to the vane case cooling air distributor based on temperature inputs from temperature sensors associated with the turbine assembly.

3. The assembly of claim 1, wherein the controller is configured to supply cooling air to the vane case cooling air distributor based on engine mode inputs associated with an engine in which the turbine assembly is included.

4. The assembly of claim 3, wherein the controller is configured to supply cooling air to the vane case cooling air distributor when an engine mode input indicates take-off power.

5. The assembly of claim 1, wherein the turbine case cooling system further includes a first valve fluidly coupled to the tip clearance cooling air distributor and a second valve fluidly coupled to the vane case cooling air distributor, and the controller is coupled to the first valve and the second valve to individually change the valves between an open position in which the cooling air is allowed to flow therethrough and a closed position in which the cooling air is blocked from flowing therethrough.

6. The assembly of claim 5, wherein the controller is configured to direct the second valve to change between the open and closed positions to vary the supply cooling air to the vane case cooling air distributor based on temperature inputs from temperature sensors associated with the turbine assembly.

7. The assembly of claim 6, wherein the controller is configured to direct the second valve to change to the open position to increase the supply of cooling air so as to cause diameter of the vane support to decrease and minimize leakage between the circumferentially adjacent vanes.

8. A turbine assembly, the assembly comprising
a vane ring including a plurality of static vanes comprising ceramic matrix composite materials,
a turbine case arranged around a central axis, the turbine case including a vane support to which at least some of the vanes included in the vane ring are mounted for movement circumferentially toward and away from one another upon contraction and expansion in diameter of the vane support caused by temperatures experienced during use of the turbine assembly, and
a turbine case cooling system including a vane case cooling air distributor configured to discharge cooling air onto the vane support of the turbine case to which the vanes of the vane ring are mounted so as to manage the temperature and diameter of the vane support such that circumferential movement of the at least some vanes caused by expansion and contraction of the vane support is controlled,
wherein the turbine case cooling system further includes a controller configured to selectively supply cooling air to the vane case cooling air distributor independent of the air supplied to the tip clearance cooling air distributor.

9. The assembly of claim 8, wherein the controller is configured to supply cooling air to the vane case cooling air distributor based on temperature inputs from temperature sensors associated with the turbine assembly.

10. The assembly of claim 8, wherein the controller is configured to supply cooling air to the vane case cooling air distributor based on engine mode inputs associated with an engine in which the turbine assembly is included.

11. The assembly of claim 10, wherein the controller is configured to supply cooling air to the vane case cooling air distributor when an engine mode input indicates take-off power.

12. The assembly of claim 8, wherein the turbine case cooling system further includes a first valve fluidly coupled to the tip clearance cooling air distributor and a second valve fluidly coupled to the vane case cooling air distributor, and the controller is coupled to the first and second valves to individually control the flow of cooling air through the first valve and the second valve.

13. The assembly of claim 12, wherein the controller is configured to direct the second valve to vary the supply cooling air to the vane case cooling air distributor based on temperature inputs from temperature sensors associated with the turbine assembly.

* * * * *